(12) United States Patent
Li (10) Patent No.: US 11,626,038 B2
(45) Date of Patent: Apr. 11, 2023

(54) FLEXIBLE SUBSTRATE AND METHOD OF MANUFACTURING SAME

(71) Applicant: SHENZHEN CHINA STAR OPTOELECTRONICS SEMICONDUCTOR DISPLAY TECHNOLOGY CO., LTD., Guangdong (CN)

(72) Inventor: Linshuang Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 417 days.

(21) Appl. No.: 16/645,476

(22) PCT Filed: Feb. 19, 2020

(86) PCT No.: PCT/CN2020/075830
§ 371 (c)(1),
(2) Date: Mar. 8, 2020

(87) PCT Pub. No.: WO2021/128544
PCT Pub. Date: Jul. 1, 2021

(65) Prior Publication Data
US 2021/0407332 A1    Dec. 30, 2021

(30) Foreign Application Priority Data
Dec. 23, 2019   (CN) .......................... 201911341119.4

(51) Int. Cl.
*G09F 9/30*    (2006.01)
*C08G 73/10*   (2006.01)
*C08J 5/18*    (2006.01)

(52) U.S. Cl.
CPC ......... *G09F 9/301* (2013.01); *C08G 73/1007* (2013.01); *C08G 73/1039* (2013.01);
(Continued)

(58) Field of Classification Search
None
See application file for complete search history.

(56) References Cited

U.S. PATENT DOCUMENTS

2005/0100719 A1    5/2005  Kanakarajan et al.
2014/0200325 A1    7/2014  Sato et al.
2016/0336537 A1*  11/2016  Tsuruoka ............ H01L 51/0097

FOREIGN PATENT DOCUMENTS

CN    102386329 A    3/2012
CN    103732655 A    4/2014
(Continued)

*Primary Examiner* — Rachel Kahn
(74) *Attorney, Agent, or Firm* — PV IP PC; Wei Te Chung; Ude Lu (57) ABSTRACT

The present application provides a flexible substrate and a method of manufacturing the same. The flexible substrate includes a base substrate, the flexible substrate is a polyimide film, wherein the polyimide film comprises polyimide having a structural formula of $$--\left[N\underset{O\ \ \ O}{\overset{O\ \ \ O}{\diagup\diagdown}}R_1\underset{O\ \ \ O}{\overset{O\ \ \ O}{\diagdown\diagup}}N-R_2\right]_{m_1}\left[N\underset{O\ \ \ O}{\overset{O\ \ \ O}{\diagup\diagdown}}R_3\underset{O\ \ \ O}{\overset{O\ \ \ O}{\diagdown\diagup}}N-R_4\right]_{m_2},$$

and the polyimide has a rigid segment and a flexible segment. The polyimide film is divided into rigid regions and a flexible region, wherein the rigid region is mainly consti-
(Continued)

tuted by the rigid segment, and the flexible region is mainly constituted by the flexible segment. Because the polyimide has the rigid segment and the flexible segment, it is used in flexible substrates.

8 Claims, 1 Drawing Sheet

(52) U.S. Cl.
CPC ..... *C08G 73/1042* (2013.01); *C08G 73/1082* (2013.01); *C08J 5/18* (2013.01); *C08J 2379/08* (2013.01)

(56) References Cited

FOREIGN PATENT DOCUMENTS

| | | | |
|---|---|---|---|
| CN | 104159975 A | | 11/2014 |
| CN | 106085464 A | | 11/2016 |
| CN | 106478950 A | | 3/2017 |
| CN | 106893125 A | | 6/2017 |
| CN | 109860205 A | | 6/2019 |
| CN | 110218315 A | | 9/2019 |
| JP | 2002206057 A | | 7/2002 |
| JP | 2012206382 A | * | 10/2012 |

* cited by examiner

FLEXIBLE SUBSTRATE AND METHOD OF MANUFACTURING SAME

BACKGROUND OF INVENTION

Field of Invention

The present application relates to a field of display panels, and in particular, to a flexible substrate and a method of manufacturing the same.

Description of Prior Art

A flexible substrate of a flexible display panel is usually made of polyimide material. During repeated bending or folding, the flexible substrate deforms or even breaks due to a large stress. At present, the stress of the flexible substrate is reduced mainly by forming protrusions or grooves on the flexible substrate by laser, but formation of the grooves or protrusions requires laser of higher energy, and the formed protrusions or grooves will cause damage to the flexible substrate, resulting in impact on the performance of the flexible substrate.

The present application provides a flexible substrate and a method of manufacturing the same, wherein a stress of the flexible substrate can be reduced directly through the flexible base material without forming grooves or protrusions on the flexible substrate with a laser.

SUMMARY OF INVENTION

The present application provides a flexible substrate and a method of manufacturing the same to improve the performance of the flexible substrate.

The present application provides a flexible substrate including a flexible base, which is a polyimide film having a surface roughness of less than 1 nanometer, wherein the polyimide film includes polyimide having a structural formula of wherein $R_1$ and $R_3$ are selected from the group consisting of and $R_2$ is selected from the group consisting of and $R_4$ is $—C_nH_{2n}—$, wherein n=1-20, wherein is a rigid segment of the polyimide, is a flexible segment of the polyimide, wherein $m_1$=1-35000, and $m_2$=1-35000.

In the flexible substrate provided by the present application, the polyimide film is divided into a first rigid region, a flexible region, and a second rigid region, and the first rigid region and the second rigid region are located at opposite sides of the flexible region, wherein the rigid segment of the polyimide in the first rigid region and the second rigid region is present in a content of 75%-95% by weight, the flexible segment of the polyimide in the first rigid region and the second rigid region is present in a content of 5%-25% by weight, the flexible segment of the polyimide in the flexible region is present in a content of 80%-98% by weight, and the rigid segment of the polyimide in the flexible region is present in a content of 2%-20% by weight.

In the flexible substrate provided by the present application, the polyimide film has a same thickness in the first rigid region, the second rigid region, and the flexible region.

In the flexible substrate provided by the present application, a side chain of each of $R_1$, $R_2$, and $R_3$ further includes one or more substituents selected from $—F$, $—C_{2x}H_{2x+2}$ and $—CF_3$, where x=1-20.

The present application provides a flexible substrate, including a flexible base, which is a polyimide film having a surface roughness of less than 1 nanometer, wherein the polyimide film includes polyimide having a structural formula of wherein $R_1$ and $R_3$ are selected from the group consisting of and $R_2$ is selected from the group consisting of and $R_4$ is —$C_nH_{2n}$—, wherein n=1-20, wherein is a rigid segment of the polyimide, is a flexible segment of the polyimide, wherein $m_1$=1-35000, and $m_2$=1-35000.

In the flexible substrate provided by the present application, the polyimide film is divided into a first rigid region, a flexible region, and a second rigid region, and the first rigid region and the second rigid region are located at opposite sides of the flexible region, wherein the rigid segment of the polyimide in the first rigid region and the second rigid region is present in a content of 75%-95% by weight, the flexible segment of the polyimide in the first rigid region and the second rigid region is present in a content of 5%-25% by weight, the flexible segment of the polyimide in the flexible region is present in a content of 80%-98% by weight, and the rigid segment of the polyimide in the flexible region is present in a content of 2%-20% by weight.

In the flexible substrate provided by the present application, the polyimide film has a same thickness in the first rigid region, the second rigid region, and the flexible region.

In the flexible substrate provided by the present application, a side chain of each of $R_1$, $R_2$, and $R_3$ further includes one or more substituents selected from —F, —$C_{2x}H_{2x+2}$ and —$CF_3$, where x=1-20.

The present application provides a method of manufacturing a flexible substrate, including:
providing a glass substrate;
coating a solution of a first polyamic acid and a solution of a second polyamic acid on the glass substrate, wherein each of the first polyamic acid and the second polyamic acid has a structural formula of wherein $m_1$=1-35000, and $m_2$=1-35000;
heating the solution of the first polyamic acid and the solution of the second polyamic acid on the glass substrate to form a flexible substrate, which is a polyimide film having a surface roughness of less than 1 nanometer, wherein the polyimide film includes polyimide having a structural formula of wherein $R_1$ and $R_3$ are selected from the group consisting of and $R_2$ is selected form the group consisting of and $R_4$ is —$C_nH_{2n}$—, wherein n=1-20, and wherein the polyimide film is divided into a first rigid region, a flexible region, and a second rigid region, the first rigid region and the second rigid region are located at opposite sides of the flexible region, the first rigid region and the second rigid region are formed from the first polyamic acid solution, and the flexible region is formed from the second polyamic acid solution, and wherein is a rigid segment of the polyimide, is a flexible segment of the polyimide, wherein $m_1$=1-35000, and $m_2$=1-35000; and laser irradiating the glass substrate and the flexible substrate, to separate the glass substrate from the flexible substrate.

In the method of manufacturing the flexible substrate provided by the present application, the polyimide film has a same thickness in the first rigid region, the second rigid region, and the flexible region.

In the method of manufacturing the flexible substrate provided by the present application, the rigid segment in the polyimide of the first rigid region and the second rigid region is present in a content of 75%-95% by weight, the flexible segment of the polyimide in the first rigid region and the second rigid region is present in a content of 5%-25% by weight, the flexible segment of the polyimide in the flexible region is present in a content of 80%-98% by weight, and the rigid segment of the polyimide in the flexible region is present in a content of 2%-20% by weight.

In the method of manufacturing the flexible substrate provided by the present application, the solution of the first polyamic acid and the solution of the second polyamic acid are formed by reacting $H_2N$—$R_6$—$NH_2$, and $H_2N$—$R_7$—$NH_2$ in a solvent, wherein $R_5$ is selected from $R_6$ is selected from and $R_7$ is —$C_nH_{2n}$—, wherein n=1-20.

In the method of manufacturing the flexible substrate provided by the present application, the solvent includes one or more combinations of acetonitrile, dimethylformamide, dimethylsulfoxide, and hexamethylphosphoryltriamine.

In the method of manufacturing the flexible substrate provided by the present application, a side chain of each of $R_1$, $R_2$, and $R_3$ further includes one or more substituents selected from —F, —$C_{2x}H_{2x+2}$ and —$CF_3$, where x=1-20.

The present application provides a flexible substrate and a method of manufacturing the same. The flexible substrate includes a base substrate, the flexible substrate is a polyimide film, and the polyimide has a rigid segment and a flexible segment. The polyimide film is divided into rigid regions and a flexible region, wherein the rigid region is mainly constituted by the rigid segment, and the flexible region is mainly constituted by the flexible segment. By varying the contents of the rigid segment and the flexible segment in the rigid region and the flexible region of the polyimide, the performances of the rigid region and the flexible region are made different, and therefore the performance of the flexible substrate can be improved by applying the polyimide to the flexible substrate.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

The present application provides a flexible substrate 10. Please refer to FIG. 1, which is a cross-sectional view of a flexible substrate provided by the present application.

Figure 1:
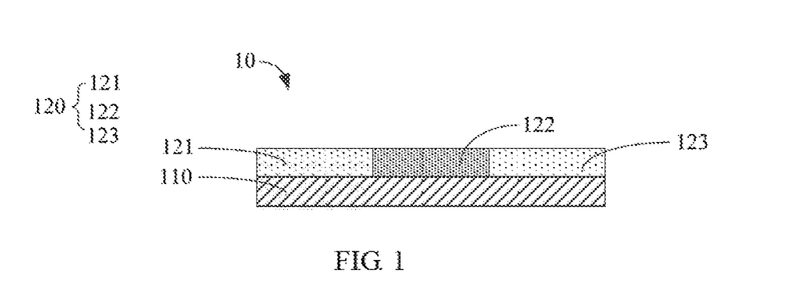
FIG. 1 is a cross-sectional view of a flexible substrate provided by the present application.

The flexible substrate 10 includes a flexible base, which is a polyimide film, wherein the polyimide film includes polyimide having a structural formula of wherein $R_1$ and $R_3$ are selected from the group consisting of and $R_2$ is selected from the group consisting of and $R_4$ is —$C_nH_{2n}$—, wherein n=1-20, wherein is a rigid segment of the polyimide, the rigid segment having a molecular weight $M_1$, is a flexible segment of the polyimide, the flexible segment having a molecular weight $M_2$, wherein $M_1$=1-35000, and $M_2$=1-35000.

In another embodiment, a side chain of each of $R_1$, $R_2$, and $R_3$ further includes one or more substituents selected from —F, —$C_{2x}H_{2x+2}$ and —$CF_3$, where x=1-20.

The polyimide film is divided into a first rigid region, a flexible region, and a second rigid region, and the first rigid region and the second rigid region are located at opposite sides of the flexible region. Specific distributions of the first rigid region, the second rigid region, and the flexible region may be adjusted according to an actual folding curvature radius, and areas of the first rigid region, the second rigid region, and the flexible region may be equal to or different from each other. In this embodiment, the areas of the first rigid region, the second rigid region, and the flexible region are equal. The rigid segment of the polyimide in the first rigid region and the second rigid region is present in a content of 75%-95% by weight ($M_1/(M_1+M_2)$), the flexible segment of the polyimide in the first rigid region and the second rigid region is present in a content of 5%-25% by weight ($M_2/(M_1+M_2)$), the flexible segment of the polyimide in the flexible region is present in a content of 80%-98% by weight ($M_2/(M_1+M_2)$), and the rigid segment of the polyimide in the flexible region is present in a content of 2%-20% by weight ($M_1/(M_1+M_2)$).

The polyimide film has a same thickness in the first rigid region, the second rigid region, and the flexible region. The polyimide film has a thickness of 10 micrometers to 30 micrometers, a surface roughness of less than 1 nanometer, and an optical transmittance at 308 nm of less than 0.1%.

The polyimide is formed by arranging and combining $R_1$, $R_2$, $R_3$ and $R_4$. In some embodiments, the polyimide has a structural formula selected from:

and so on.

The flexible substrate can be used for various flexible displays, such as flexible LCD, flexible OLED, and flexible Micro-LED.

In the present application, the polyimide is employed to control the content of the rigid segment and the content of the flexible segment to form the alternately distributed rigid region and flexible region, wherein the rigid region is mainly constituted by the rigid segment, such that heat resistance and dimensional stability of the flexible substrate are improved, while the flexible region is mainly constituted by the flexible segment, such that flexibility of the flexible substrate is improved. Because the flexible region has higher flexibility, and a polyimide molecular segment at an interface between the rigid region and the flexible region has an interpenetrating network structure, the folding stability of the flexible substrate is improved, that is, the performance of the flexible substrate is improved.

Figure 2:
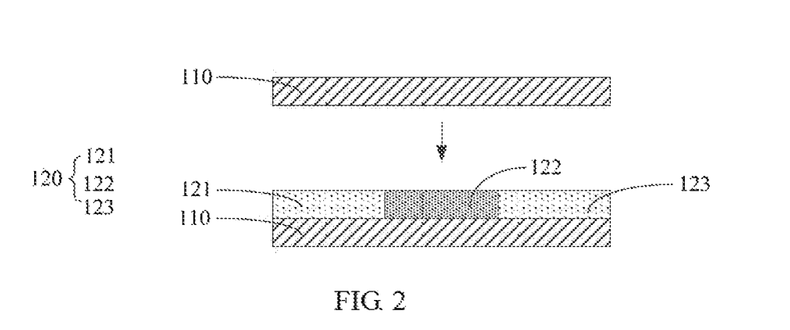
FIG. 2 is a cross-sectional view of a flow chart of manufacturing a flexible substrate provided by the present application.

Please refer to FIG. 2, which is a cross-sectional view of a flow chart of manufacturing a flexible substrate provided by the present application. The present application also provides a method of manufacturing a flexible substrate 10, including:

A. providing a glass substrate 110.

B. coating a solution of a first polyamic acid and a solution of a second polyamic acid on the glass substrate 110.

Specifically, the first polyamic acid solution and the second polyamic acid solution are coated on the glass substrate 110 by slit coating to form a first rigid region 121, a flexible region 122, and a second rigid region 123. The first rigid region 121 and the second rigid region 123 are located on opposite sides of the flexible region 122. The areas of the first rigid region 121, the second rigid region 123, and the flexible region 122 may be equal to or different from each other. In this embodiment, the areas of the first rigid region 121, the second rigid region 123, and the flexible region 122 are the same. A thickness of the first polyamic acid solution applied on the first rigid region 121 and the second rigid region 123 is the same as a thickness of the second polyamic acid solution applied on the flexible region 122. The first polyamic acid solution includes a first polyamic acid and a solvent. The second polyamic acid solution includes a second polyamic acid and a solvent. Each of the first polyamic acid and the second polyamic acid has a structural formula of wherein $m_1=1\text{-}35000$, and $m_2=1\text{-}35000$. The solvent includes one or more combinations of acetonitrile, dimethylformamide, dimethylsulfoxide, and hexamethylphosphoryltriamine.

In another embodiment, a side chain of each of $R_1$, $R_2$, and $R_3$ further includes one or more substituents selected from —F, —$C_{2x}H_{2x+2}$ and —$CF_3$, where x=1-20.

In another embodiment, each of the first polyamic acid solution and the second polyamic acid solution further includes a curing agent, which includes one or more combinations of m-phenylenediamine, diaminodiphenylmethane, diaminodiphenylsulfone, maleic anhydride, phthalic anhydride, hexahydrophthalic anhydride, dicyandiamine, acetylhydrazine, benzenesulfonyl hydrazide, urea-formaldehyde resin, melamine formaldehyde resin, and polyamide polyamine epichlorohydrin.

Further, the step of forming the first polyamic acid solution and the second polyamic acid solution includes: providing a first reactant, a second reactant, and a third reactant, and polymerizing the first reactant, the second reactant, and the third reactant to form the first polyamic acid solution or the second polyamic acid solution.

The first reactant is

R5 is selected from or more combinations of the second reactant is H$_2$N—R$_6$—NH$_2$, R6 is selected from one or more combinations of the third reactant is H$_2$N—R$_7$—NH$_2$, and R7 may be —C$_n$H$_{2n}$—, wherein n=1-20.

Each of the first polyamic acid and the second polyamic acid has a structural formula wherein m$_1$=1-35000, and m$_2$=1-35000.

The first reactant has a structural formula

The second reactant has a structural formula H$_2$N—R$_6$—NH$_2$. The third reactant has a structural formula H$_2$N—R$_7$—NH$_2$.

A reaction scheme for polymerization of the first reactant the second reactant H$_2$N—R$_6$—NH$_2$, and the third reactant to form the first polyamic acid or the second polyamic acid may be:

In an embodiment, the first reactant, the second reactant, and the third reactant are added to the solvent in a molar ratio of 2:1:1.

In an embodiment, the polymerization is performed at a temperature of −10 degrees Celsius to 10 degrees Celsius.

In an embodiment, the solvent includes one or more combinations of acetonitrile, dimethylformamide, dimethylsulfoxide, and hexamethylphosphoryltriamine.

In an embodiment, a side chain of each of R$_1$, R$_2$, and R; further includes one or more substituents selected from —F, —C$_{2x}$H$_{2x+2}$ and —CF$_3$, where x=1-20.

In an embodiment, after polymerizing the first reactant, the second reactant, and the third reactant, a curing agent is added to form the first polyamic acid or the second polyamic acid solution. The curing agent includes one or more combinations of m-phenylenediamine, diaminodiphenylmethane, diaminodiphenylsulfone, maleic anhydride, phthalic anhydride, hexahydrophthalic anhydride, dicyandiamine, acetylhydrazine, benzenesulfonyl hydrazide, urea-formaldehyde resin, melamine formaldehyde resin and polyamide polyamine epichlorohydrin.

In an embodiment, the first reactant may be the second reactant may be and the third reactant may be H$_2$N—CH$_2$CH$_2$—NH$_2$.

The reaction scheme of synthesizing the first polyamic acid or the second polyamic acid by the first reactant, the second reactant, and the third reactant may be:

In an embodiment, 2 moles of the first reactant

1 mole of the second reactant and 1 mole of the third reactant $H_2N-CH_2CH_2-NH_2$ are added to a round bottom flask, and dimethylformamide is added, followed by reaction with continuously stirring for 12 hours to 56 hours to obtain the first polyamic acid or the second polyamic acid second reactant and 1 mole of the third reactant $H_2N-CH_2CH_2-NH_2$ are added to a round bottom flask, then dimethylformamide is added, followed by reaction with continuously stirring for 12 hours to 56 hours, and after the reaction is completed, maleic anhydride is added to obtain the first polyamic acid or the second polyamic acid In an embodiment, the first reactant may be the second reactant may be and the third reactant may be $H_2N-CH_2CH_2-NH_2$.

The reaction scheme of synthesizing the first polyamic acid or the second polyamic acid by the first reactant, the second reactant, and the third reactant may be:

In an embodiment, 2 moles of the first reactant

1 mole of the second reactant and 1 mole of the third reactant $H_2N-CH_2CH_2-NH_2$ are added to a round bottom flask, and dimethylformamide is added, followed by reaction with continuously stirring for 12 hours to 56 hours, to obtain the first polyamic acid or the second polyamic acid

In an embodiment. 2 moles of the first reactant 1 mole of the second reactant and 1 mole of the third reactant H$_2$N CH$_2$CH$_2$—NH$_2$ are added to a round bottom flask, then dimethylformamide is added, followed by reaction with continuously stirring for 12 hours to 56 hours, and after the reaction is completed, maleic anhydride is added to obtain the first polyamic acid or the second polyamic acid

In the present application, the surface roughness of the formed polyimide film can be controlled by a viscosity, a coating speed, and a surface tension of each of the first polyamic acid solution and the second polyamic acid solution.

C. heating the first polyamic acid solution and the second polyamic acid solution on the glass substrate 110 to form a flexible base 120.

Each of the first polyamic acid and the second polyamic acid may have a structural formula wherein R$_1$ and R$_3$ are selected from the group consisting of

R$_2$ is selected from the group consisting of

-continued

, and and $R_4$ is —$C_nH_{2n}$—, wherein n=1-20.

is a rigid segment of the polyimide, is a flexible segment of the polyimide, wherein $m_1$=1-35000, and $m_2$=1-35000.

In an embodiment, the first polyamic acid or the second polyamic acid may have a structural formula of The reaction scheme for polymerization of the first polyamic acid or the second polyamic acid to form the polyimide may be:

In an embodiment, the heat treatment includes a first-stage heat treatment and a second-stage heat treatment. The first polyamic acid or the second polyamic acid is subjected to the first-stage heat treatment at a temperature of 50 degrees Celsius to 200 degrees Celsius for a first-stage heat treatment time of 0.5 hours to 3 hours, to remove the solvent, which is dimethylformamide, to form a first-stage product having an imidization degree of higher than 80%, and the solvent content of the first-stage product is lower than 5%.

The first-stage product is subjected to the second-stage heat treatment, to remove the solvent dimethylformamide again, to form the polyimide film

The second-stage heat treatment is performed at a temperature of 300 degrees Celsius to 800 degrees Celsius for 0.5 hours to 3 hours. After the second-stage heat treatment, a polyimide film is formed, which has an imidization degree reaching more than 99%, and the solvent content of the polyimide film is less than 0.5%.

In an embodiment, the first polyamic acid or the second polyamic acid may have a structural formula of The reaction scheme for polymerization of the first polyamic acid or the second polyamic acid to form the polyimide may be:

wherein $m_1$=1-35000, and $m_2$=1-35000.

In an embodiment, the heat treatment includes a first-stage heat treatment and a second-stage heat treatment. The first polyamic acid or the second polyamic acid is subjected to the first-stage heat treatment at a temperature of 50 degrees Celsius to 200 degrees Celsius for a first-stage heat treatment time of 0.5 hours to 3 hours, to remove the solvent, which is dimethylformamide, to form a first-stage product having a amination degree of higher than 80%, and the solvent present in the first-stage product has a content of lower than 5%.

The first-stage product is subjected to the second-stage heat treatment, to remove the dimethylformamide as the solvent again, to form the polyimide film The second-stage heat treatment is performed at a temperature of 300 degrees Celsius to 800 degrees Celsius for 0.5 hours to 3 hours. After the second-stage heat treatment, a polyimide film is formed, which has an imidization degree reaching more than 99%, and the solvent present in the polyimide film is less than 0.5%.

The flexible base 120 is the polyimide film. The formed polyimide film is divided into a first rigid region 121, a flexible region 122, and a second rigid region 123. The first rigid region 121 and the second rigid region 123 are formed of the first polyamic acid solution, and the flexible region 122 is formed of the second polyamic acid solution. The rigid segment of the polyimide in the first rigid region and the second rigid region is present in a content of 75% Vo-95% by weight ($M_1/(M_1+M_2)$), the flexible segment of the polyimide in the first rigid region and the second rigid region is present in a content of 5%-25% by weight ($M_2/(M_1+M_2)$), the flexible segment of the polyimide in the flexible region is present in a content of 80%-98% by weight ($M_2/(M_1+M_2)$), and the rigid segment of the polyimide in the flexible region is present in a content of 2%-20% by weight ($M_1/(M_1+M_2)$).

The polyimide film has a same thickness in the first rigid region, the second rigid region, and the flexible region. The polyimide film has a thickness of 10 micrometers to 30 micrometers, a surface roughness of less than 1 nanometer, and an optical transmittance at 308 nm of less than 0.1%.

In the present application, the surface roughness of the formed polyimide film can be controlled by a viscosity, a coating speed, and a surface tension of each of the first polyamic acid solution and the second polyamic acid solution.

D. laser irradiating the glass substrate 110 and the flexible substrate 120, to separate the glass substrate 110 from the flexible substrate 120.

Specifically, the glass substrate 110 and the flexible base 120 are processed by laser lifting-off, so that laser light is incident from a back of the glass substrate 110. The laser may have a wavelength of 308 nanometers, so that the glass substrate 110 is separated from the flexible base 120.

The present application provides a flexible substrate and a method of manufacturing the same. The flexible substrate includes a base substrate, the flexible substrate is a polyimide film, and the polyimide has a rigid segment and a flexible segment. The polyimide film is divided into rigid regions and a flexible region, wherein the rigid region is mainly constituted by the rigid segment, and the flexible region is mainly constituted by the flexible segment. By controlling variation of the content of the rigid segment and the flexible segment in the rigid region and the flexible region of the polyimide, the performances of the rigid region and the flexible region are different, and therefore the performance of the flexible substrate can be improved by applying the polyimide to the flexible substrate.

The embodiments of the present invention have been described in detail above. Specific examples are used in this document to explain the principles and implementation of the present invention. The descriptions of the above embodiments are only for understanding the method of the present invention and its core idea; Meanwhile, for those skilled in the art, according to the idea of the present invention, there will be changes in the specific implementation and application scope. In summary, the content of this specification should not be construed as a limitation on the present invention.

What is claimed is:

1. A flexible substrate, comprising a flexible base, which is a polyimide film having a surface roughness of less than 1 nanometer, wherein the polyimide film comprises polyimide having a structural formula of wherein $R_1$ and $R_3$ are non-substituted or substituted by —F or —CF$_3$, and selected from the group consisting of and $R_2$ is non-substituted or substituted by —F or —CF$_3$, and selected from the group consisting of and $R_4$ is —C$_n$H$_{2n}$—, wherein n=1-20, wherein is a rigid segment of the polyimide, is a flexible segment of the polyimide, wherein $m_1$=1-35000, and $m_2$=1-35000; and wherein the polyimide film is divided into a first rigid region, a flexible region, and a second rigid region, and the first rigid region and the second rigid region are located at opposite sides of the flexible region, wherein the rigid segment of the polyimide in the first rigid region and the second rigid region is present in a content of 75%-95% by weight, the flexible segment of the polyimide in the first rigid region and the second rigid region is present in a content of 5%-25% by weight, the flexible segment of the polyimide in the flexible region is present in a content of 80%-98% by weight, and the rigid segment of the polyimide in the flexible region is present in a content of 2%-20% by weight.

2. The flexible substrate according to claim 1, wherein the polyimide film has a same thickness in the first rigid region, the second rigid region, and the flexible region.

3. The flexible substrate according to claim 1, wherein each of the $R_1$ group, the $R_2$ group, and the $R_3$ group further comprises one or more substituents selected from —F and —CF$_3$.

4. A method of manufacturing a flexible substrate, comprising:

providing a glass substrate;

coating a solution of a first polyamic acid and a solution of a second polyamic acid on the glass substrate, wherein each of the first polyamic acid and the second polyamic acid has a structural formula of wherein $m_1$=1-35000, and $m_2$=1-35000;

heating the solution of the first polyamic acid and the solution of the second polyamic acid on the glass substrate to form a flexible substrate, which is a polyimide film having a surface roughness of less than 1 nanometer, wherein the polyimide film comprises polyimide having a structural formula of wherein $R_1$ and $R_3$ are non-substituted or substituted by —F or —CF$_3$, and selected from the group consisting of

$R_2$ is non-substituted or substituted by —F or —$CF_3$, and selected from the group consisting of and $R_4$ is —$C_nH_{2n}$—, wherein n=1-20, and wherein the polyimide film is divided into a first rigid region, a flexible region, and a second rigid region, the first rigid region and the second rigid region are located at opposite sides of the flexible region, the first rigid region and the second rigid region are formed from the first polyamic acid solution, and the flexible region is formed from the second polyamic acid solution, and wherein is a rigid segment of the polyimide, is a flexible segment of the polyimide, wherein $m_1$=1-35000, and $m_2$=1-35000; and laser irradiating the glass substrate and the flexible substrate, to separate the glass substrate from the flexible substrate, wherein the rigid segment in the polyimide of the first rigid region and the second rigid region is present in a content of 75%-95% by weight, the flexible segment of the polyimide in the first rigid region and the second rigid region is present in a content of 5%-25% by weight, the flexible segment of the polyimide in the flexible region is present in a content of 80%-98% by weight, and the rigid segment of the polyimide in the flexible region is present in a content of 2%-20% by weight.

5. The method of manufacturing the flexible substrate according to claim 4, wherein the polyimide film has a same thickness in the first rigid region, the second rigid region, and the flexible region.

6. The method of manufacturing the flexible substrate according to claim 4, wherein the solution of the first polyamic acid and the solution of the second polyamic acid are formed by reacting $H_2N$—$R_6$—$NH_2$, and $H_2N$—$R_7$—$NH_2$ in a solvent, wherein $R_5$ is selected from $R_6$ is selected from and $R_7$ is —$C_nH_{2n}$—, wherein n=1-20.

7. The method of manufacturing the flexible substrate according to claim 4, wherein the solvent comprises acetonitrile, dimethylformamide, dimethylsulfoxide, hexamethylphosphoryltriamine, or combinations thereof.

8. The method of manufacturing the flexible substrate according to claim 4, wherein each of $R_1$, $R_2$, and $R_3$ further comprises one or more substituents selected from —F and —$CF_3$.

* * * * *